W. F. COX.
APPARATUS FOR CLEANING AND HEATING AIR.
APPLICATION FILED JAN. 25, 1916.
1,233,555.
Patented July 17, 1917.
3 SHEETS—SHEET 2.
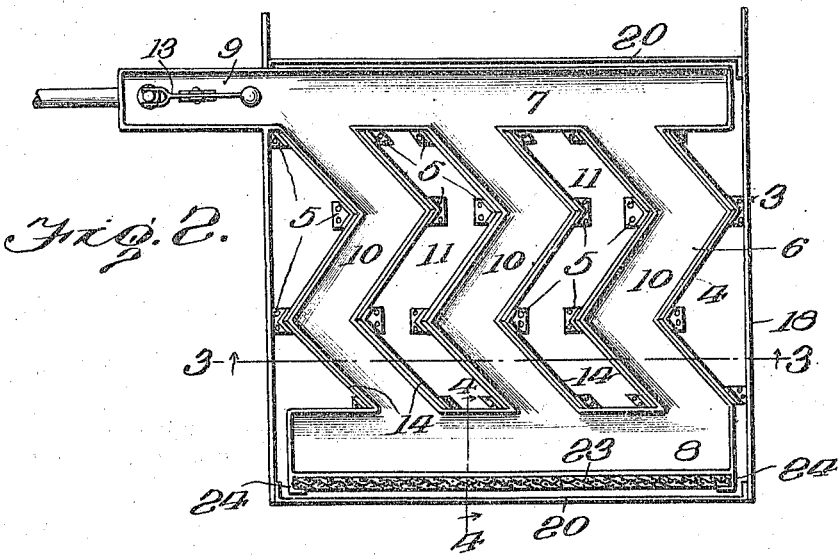
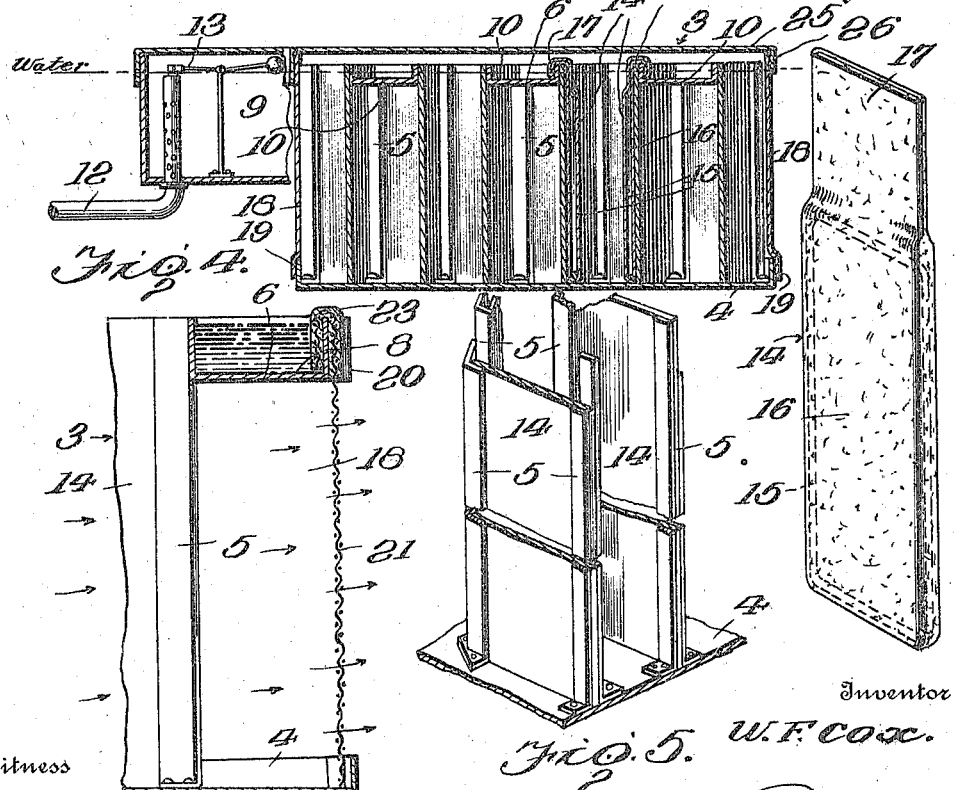

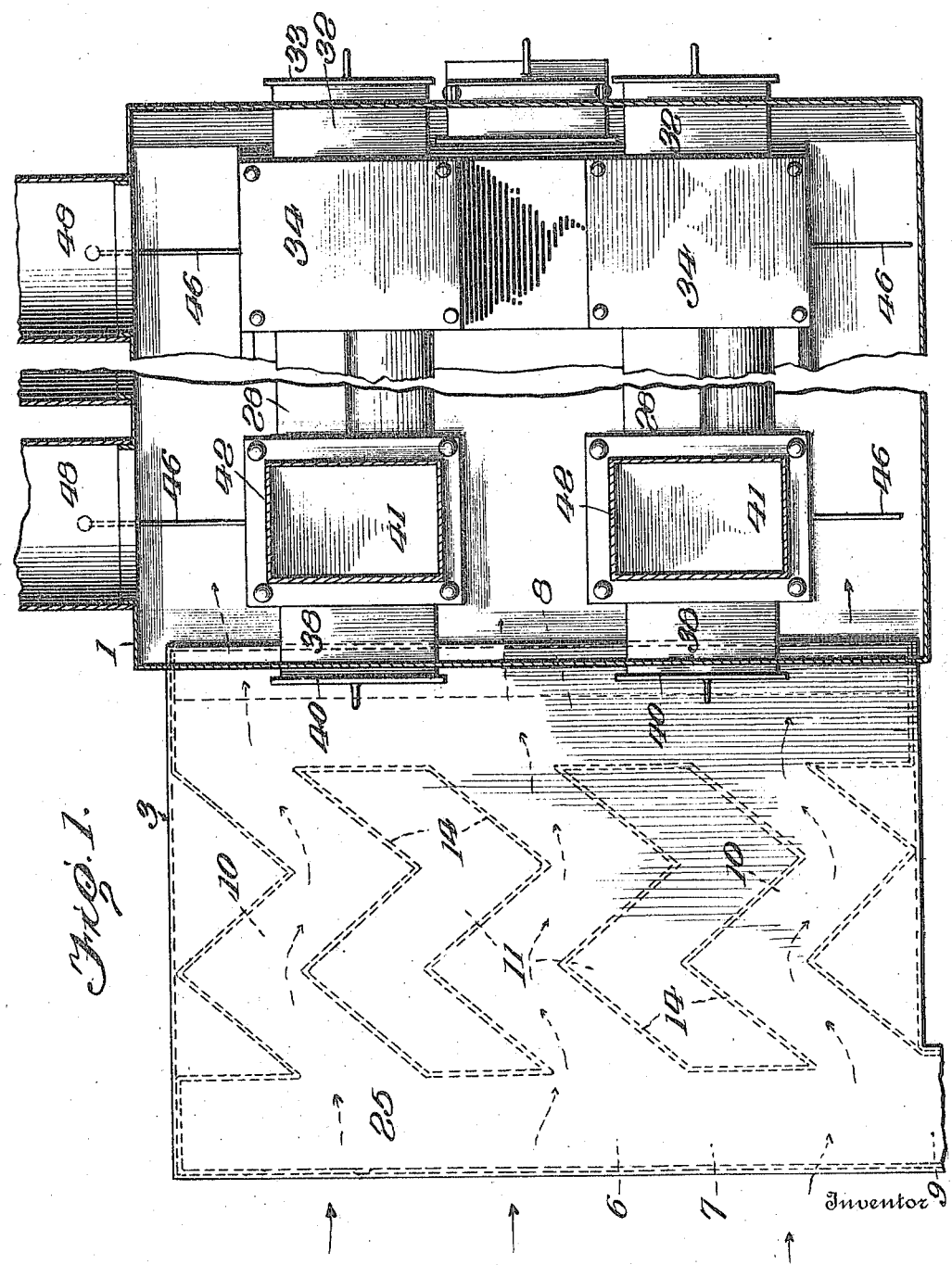

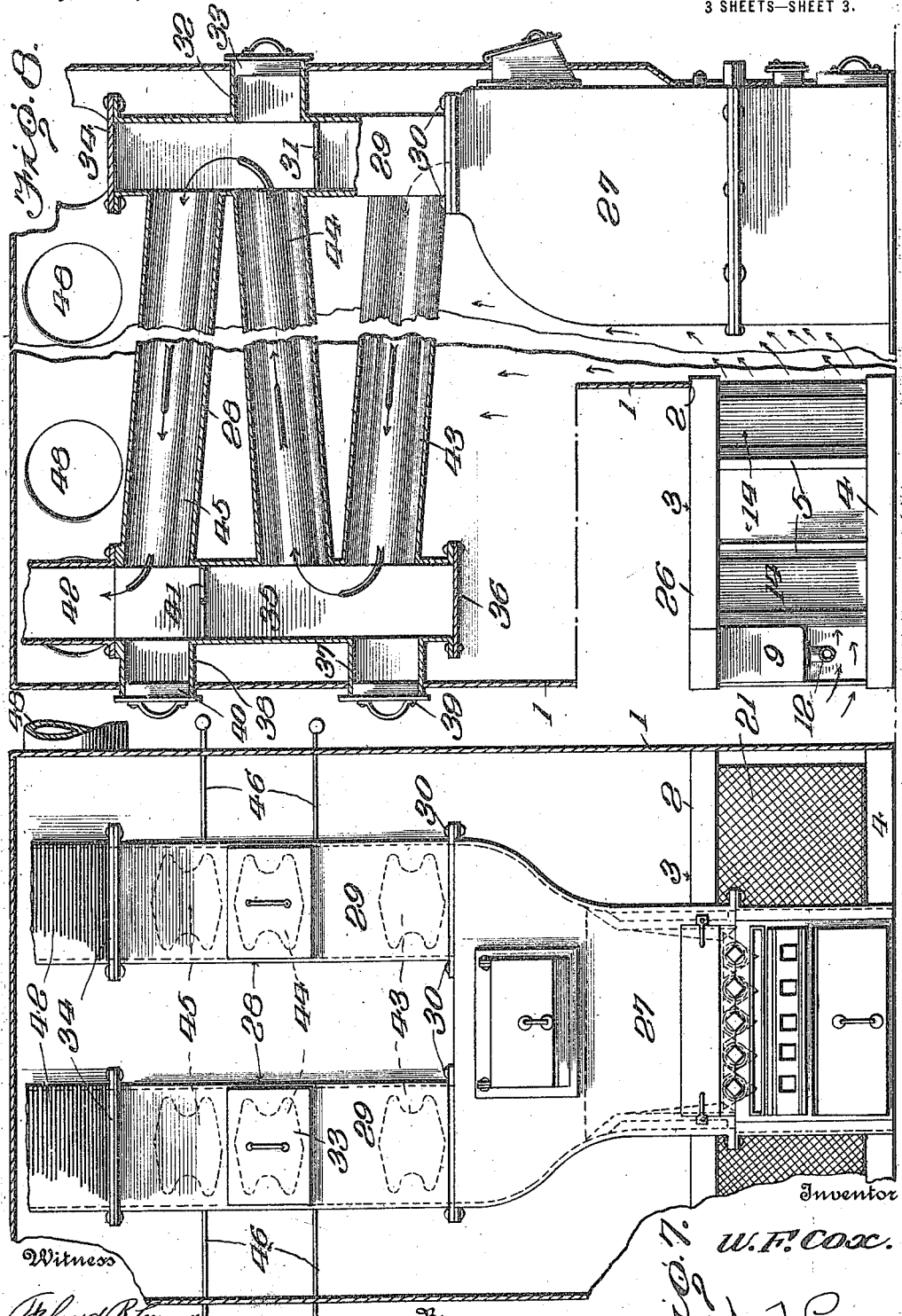

UNITED STATES PATENT OFFICE.

WILLIAM F. COX, OF DANVILLE, VIRGINIA.

APPARATUS FOR CLEANING AND HEATING AIR.

1,233,555.  Specification of Letters Patent.  Patented July 17, 1917.

Application filed January 25, 1916. Serial No. 74,210.

*To all whom it may concern:*

Be it known that I, WILLIAM F. COX, citizen of the United States, residing at Danville, in the county of Pittsylvania and State of Virginia, have invented certain new and useful Improvements in Apparatus for Cleaning and Heating Air; and I do hereby declare the following to be a full, clear, and exact description of the invention, such as will enable others skilled in the art to which it appertains to make and use the same.

My invention consists in the novel features hereinafter described, reference being had to the accompanying drawings, in which I have shown one form or embodiment of my invention, selected by me for purposes of illustration, and the said invention is fully disclosed in the following specification and claims.

Referring to the said drawings,

Figure 1 is a top plan view of my improved apparatus for cleaning and heating air to be utilized in hot air heating systems.

Fig. 2 is a top plan view of the air cleaning or filtering device forming a part of my improved apparatus, the cover of the same being removed.

Fig. 3 is a transverse vertical sectional view of the air filter taken on line 3—3 of Fig. 2, a portion of the water tank being broken away to illustrate the float valve.

Fig. 4 is a detail longitudinal vertical sectional view taken on line 4—4 of Fig. 2.

Fig. 5 is a perspective view of a detail showing a few of the air filter baffles and the guides for the same.

Fig. 6 is a perspective view of one of the air baffles, the frame for the same being shown in dotted lines.

Fig. 7 is an end view of the entire apparatus.

Fig. 8 is a side view of the entire apparatus, certain details being in section for the purpose of clearness.

The object of my invention is to provide an improved apparatus for cleaning and heating air for use in hot air heating systems and the invention comprises a liquid pan, a series of removable absorbent baffles arranged to draw the liquid from said pan for cleaning the air which passes said baffles, and a heating chamber for the filtered air, all of said parts being of knock down construction and capable of being removed from the apparatus for cleaning or renewing the same, without taking down the whole apparatus.

A number of extremely advantageous results are obtained by this novel construction. For example, in the use of devices of this character, when the absorbent baffles become soiled by the deposit of dirt thereon, or become worn beyond repair, or in case the heating flues become burnt out, the entire apparatus must be taken apart in order to clean or repair the same. This is particularly objectionable during the time when continued heating of the building is necessary, as the whole apparatus must be thrown out of operation during the time required for repairing or the like. These parts cannot be advantageously removed from or replaced in the apparatus except by an experienced workman, skilled in the art of heating.

By my improved construction the parts which bear the brunt of the work in cleaning and heating the air can be removed, cleaned or repaired and placed in perfect condition in its proper position in the device by an unskilled workman. If desired, a new part can be used in place of the one removed, so that the apparatus itself will not be put out of use for a protracted period.

Also in my improved device a disinfectant may be added to the liquid in the liquid pan so that the air will not only be cleaned before heating, but it will also be made sanitary and as the device cleans the air before heating, the same air may be utilized over and over, and it will not be necessary to extend an air flue from the furnace to the exterior atmosphere.

In the drawings, 1 designates the casing of the apparatus, which is provided at one end with an air inlet 2. Located partly within the casing and having one of its ends communicating with the inlet 2, is the air filter or cleaner 3.

The air filter comprises a drip pan 4, provided with upstanding guides 5, which are arranged in staggered relation and form supports for a liquid pan 6. The liquid pan 6 consists of opposite end portions 7 and 8, one of which communicates with a supply tank 9, and which are connected by staggered or zig-zag portions 10, having staggered openings 11, located between them. A pipe 12 supplies the tank 9 with liquid and a float valve 13 controls the quantity of liquid from the supply to the tank.

Baffles 14, each of which consists of a frame 15, best shown in Fig. 6, which is inserted in a bag or sack 16 formed of suitable absorbent material are inserted from the top into the guides 5 and the upper ends 17 of said sacks are adapted to be folded over into the staggered portions 10 of the liquid pan 6. These ends 17 of the baffles will act as wicks and by capillary attraction draw liquid from the pan 6 and said liquid will then descend the baffles 14 by gravity. This will constantly maintain the baffles in moist condition and impurities in the air passing between the baffles will be lodged on the surface of said baffles.

18 represents the sides of the air filter which are preferably, though not necessarily, continuations of the casing 1. These sides connect the top and bottom pans 4 and 6, their lower edges being flanged as shown at 19, to snugly embrace the pan 4. Bars 20 extend across the ends of the filter and connect the upper and lower edges of the sides or plates 18, a space being left between the same for the passage of the air.

A wire screen 21 provided at its upper end with a wick 23 which rests in the pan 6, is mounted in guides 24 located at the outlet end of the air filter and the air after passing through the baffles 14, passes through said screen 21 and is thereby effectually cleansed.

A cover 25 having a depending flange 26 is removably secured to the upper end of the air filter and when it is desired to remove a baffle or baffles for the purpose of cleaning or renewing the cover or covers of the same, this top 25 is removed and the baffles to be removed are drawn out.

The means for heating the purified air comprises a furnace 27 of any desired construction located within the casing 1 and having its flues for the conveyance of the products of combustion formed in a particular manner, which will now be described.

The headers or heating flues 28 for the conveyance of the heated gases, comprise a plurality of vertically arranged pipes 29, one of which is provided over each of the furnace flues openings and is connected to the furnace by means of screws 30. Each of these pipes 29 is provided with a pivoted damper 31, an integral clean-out sleeve 32, closed by a cover 33, and a removable plate 34 covers the upper end of the pipe. Located at a distance from the pipes 29, and suitably supported within the casing 1, is a plurality of vertically arranged pipes 35, which are closed at their lower ends by removable covers 36. Each of the pipes 35 is provided with a plurality of integral clean-out sleeves 37, 38 closed by covers 39 and 40 and a pivoted damper 41 is provided in said pipe, between the two clean-out sleeves. Pipes 42 are removably secured to the upper ends of the pipes 35 for conveying the gases to the chimney (not shown). A series of longitudinally corrugated pipes 43, 44 and 45, integral with the pipes 29 and 35, establish communication between the two last named pipes, and the pipes 43, 44 and 45 are arranged diagonally or slantingly to form, in connection with the pipes 29 and 35, a zig-zag or staggered passage or flue, whereby the greatest heat efficiency is obtained from the products of combustion.

When the furnace is used for heating, the air which enters the casing 1, the dampers 31 and 41 are closed, but should it be desired to permit the gases to pass directly to the chimney, the dampers 31 are opened, and the products of combustion pass up through the pipes 29, then through the pipes 45, and the upper ends of the pipes 35, and finally through the pipes 42 to the chimney.

The dampers may be operated by any suitable means, and I have provided for this purpose, the operating handles 46, which extend outside of the casing 1.

By forming the headers or heating flues 28 of a single integral piece, I obtain a heater which is practically gas tight and by removably connecting the headers to the furnace and to the pipes 42, I can remove the same at any time and quickly substitute a similar unit in its place, and where it is desired to have a greater number of headers 28, I can build up a header to the desired size, by reversing each alternate unit and connecting them together.

The heated air passes off to the different points of the building to be heated through the flues 48 and it will be understood that by constructing my heating flue or header in the manner described, I obtained a maximum heating efficiency without the escape of fuel gases, and that the heater may be built to any required size, owing to the parts being interchangeable.

What I claim and desire to secure by Letters Patent is:—

1. In an apparatus for cleaning and heating air, an air filter comprising a liquid containing receptacle provided with staggered openings, a series of guides arranged beneath said receptacle, and a series of removable absorbent baffles located in said guides and having wicks which pass through said openings and rest in said receptacle for drawing liquid from the same, said baffles being removable by lifting the same upwardly through the openings in the receptacle.

2. In an apparatus for cleaning and heating air, an air filter comprising a liquid containing receptacle, a series of guides arranged beneath said receptacle, and a series of removable baffles located in said guides, said baffles being formed of absorbent material and having wicks which rest in said pan for drawing liquid from the same.

3. In an apparatus for cleaning and heating air, an air filter comprising a liquid containing receptacle, a series of staggered guides located beneath said receptacle, and a series of removable absorbent baffles arranged in said guides and provided with wicks which rest in said receptacle for drawing liquid from the same.

4. In an apparatus for cleaning and heating air, an air filter comprising a liquid containing receptacle, a series of staggered guides located beneath said receptacle, a series of removable absorbent baffles arranged in said guides and provided with wicks which rest in said receptacle for drawing liquid from the same, and a screen which also has a wick resting in said receptacle for drawing liquid from the same, the air after passing said baffles being adapted to pass through said screen.

5. In an apparatus for cleaning and heating air, an air filter comprising a drip pan, a series of vertically extending staggered guides provided on said pan, a liquid containing receptacle supported by said guides and provided with staggered openings, and a series of removable absorbent baffles provided in said guides and having wicks which pass through said openings and rest in said receptacle for drawing liquid from the same.

6. In an apparatus for cleaning and heating air, an air filter comprising a drip pan, a series of vertically extending staggered guides provided on said pan, a liquid containing receptacle supported by said guides and provided with staggered openings, a supply tank communicating with said receptacle and provided with an inlet having a float valve control, a series of removable absorbent baffles provided in said guides and having wicks which pass through said openings and rest in said receptacle for drawing liquid from the same, and a screen arranged at the outer end of said filter, said screen being also provided with a wick which rests in said receptacle for drawing liquid from the same.

7. In an apparatus for cleaning air, the combination with a liquid containing receptacle, of a series of baffles each of which comprises a frame covered with a sack formed of absorbent material, the upper ends of the sacks forming wicks which rest in said receptacle for drawing liquid from the same.

In testimony whereof I affix my signature.

WILLIAM F. COX.